UNITED STATES PATENT OFFICE.

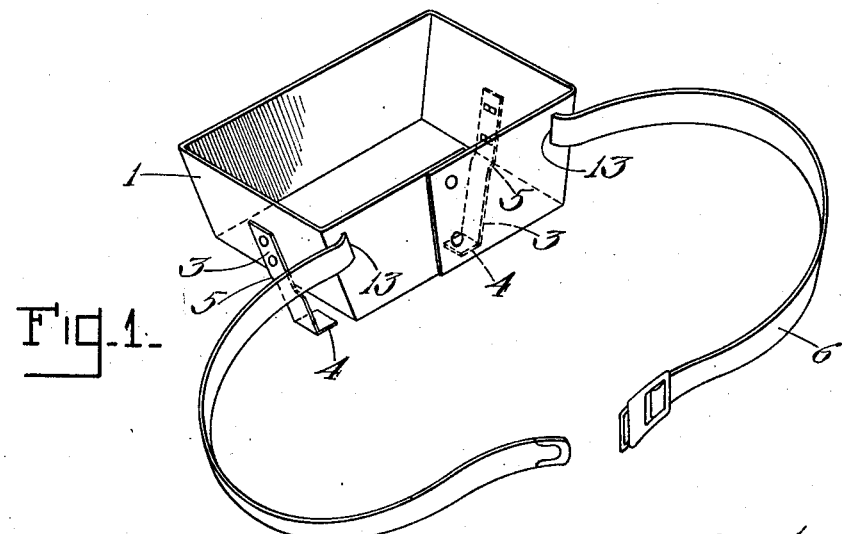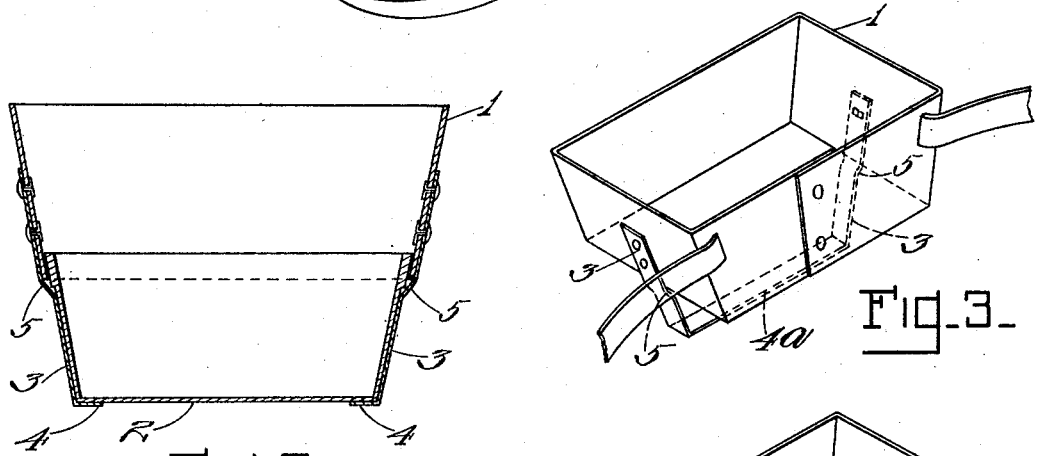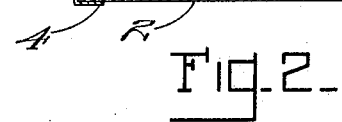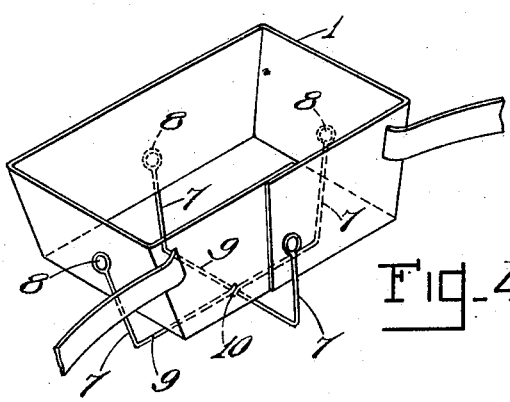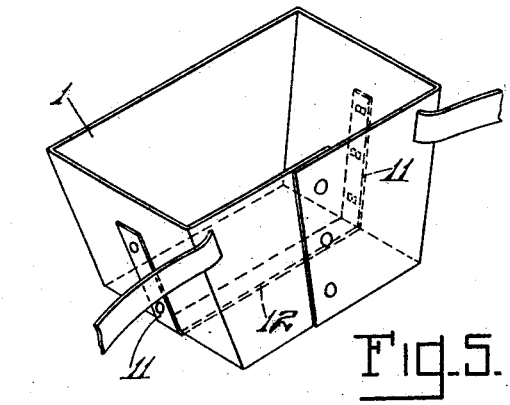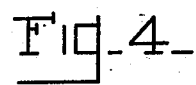

PAUL I. ANDREWS, OF KENNEBUNK, MAINE.

BOX HOLDER FOR BERRY PICKERS.

1,406,326.

Specification of Letters Patent.  Patented Feb. 14, 1922.

Application filed March 31, 1921. Serial No. 457,214.

*To all whom it may concern:*

Be it known that I, PAUL I. ANDREWS, a citizen of the United States, residing at Kennebunk, county of York, State of Maine, have invented a certain new and useful Improvement in Box Holders for Berry Pickers, of which the following is a specification, reference being had therein to the accompanying drawings.

In picking berries, particularly raspberries and blackberries and other berries which grow on bushes, when they are picked directly into the boxes in which they are usually placed on the market, only one hand is available for picking, because the other hand is required for holding the box unless the bushes are low enough so that the box can be left on the ground, and even then the berries are likely to be dropped into the box from too great a height, thereby bruising the berries. Moreover the box has to be frequently moved by hand to a new picking place. This makes much slower work than if both hands were available for picking. Berries, such as raspberries and other berries which are pulpy and easily crushed, cannot be picked in a large receptacle and then poured into the boxes without great damage to the berries.

The object of the present invention is to provide a shell which can be readily fastened to the picker by a strap or other suitable means, and which is of such shape that it will serve as a holder for the ordinary berry box while picking the berries and into which the box may be easily inserted and removed; also to have the shell serve as a hopper to guide the berries into the box and prevent the berries from being spilled out of the box during the picking.

The invention will be fully understood from the following description when taken in connection with the accompanying drawings, and the novel features thereof will be pointed out and clearly defined in the claims at the close of this specification.

In the drawings, Fig. 1 is a perspective view of a device embodying the invention provided with straps for fastening it to the waist of the picker.

Fig. 2 is a vertical sectional view of the device shown in Fig. 1 having an ordinary berry box inserted therein as it will be in position for use.

Fig. 3 is a perspective view of a modified form of holder.

Fig. 4 is a perspective view of still another modification.

Fig. 5 is a view of a third modification.

Referring now to the drawings, 1 represents a shell of rectangular formation in plan view and having the four walls downwardly inclined toward each other forming a somewhat hopper-shaped construction of rectangular form and having an open bottom.

The taper of the sides should be the same angle of taper as the sides of the berry boxes 2 into which the berries are to be picked. The berry boxes are supposed to be the ordinary wooden boxes in which the berries are marketed.

Secured to each end wall of the shell 1 is a strip 3 of resilient material which extends down for some distance below the bottom of the shell 1, and has at its lower end an under turned portion 4 which projects in under the open bottom of the shell. The strip members 3 should extend some distance below the lower edge of the shell so that when the box 2 is inserted the bottom of the box will extend to some distance below the open bottom of the shell and may rest on the supports formed by the under turned portions 4 of the strips 3.

Preferably these strips 3 are of somewhat springy or resilient material and as the downwardly extending portions converge toward each other, the distance between them at their lower ends will be somewhat less than the width of the opening at the bottom of the shell so that when the box 2 is inserted and pushed down it will serve as a wedge to spread the two members 3—3 somewhat further apart from each other. In this manner the said members 3—3 being of springy material will exert a spring pressure on the box to retain it more firmly in place and prevent it from rattling around in the holder.

Preferably the members 3 are formed with an offset 5 just below the lower edge of the side wall of the shell so as to bring the lower extending portions into a still more inward position. This causes the members 3—3 to hug tightly the sides of the berry box and hold it firmly in position. A suitable strap should be provided for securing the holder to the body of the berry picker. As shown in the drawings a belt strap 6 is provided which is secured to the holder in any suitable way, and it is passed through slots at 13 in the side of the shell. The particular manner of fastening the strap to the shell, however, is immaterial.

In the modification shown in Figure 3, the two side strip members 3—3 are connected by a bottom box supporting portion 4ª, instead of being formed as two separate strips as in Figures 1 and 2. If the strip is made of resilient material, such as thin spring metal or thin fibre board, the offset portions 5 will afford a slight yield to permit the strip to bend outwardly as the berry box is pushed down between the two members 3—3 and onto the bottom support 4ª.

In the modification shown in Figure 4, the bottom support for the berry box is formed of wires. In the preferred form, there are two of these wires crossing each other at right angles. Each wire member has two opposite downwardly extending portions 7—7 each secured at the upper ends 8 to one of the walls of the box, and at the lower ends they are connected by a transverse portion 9, as shown in the drawings. Preferably one of the bottom members 9 is twisted around the other bottom member 9 as by a loop 10 at their intersection so as to hold them in proper relative position. It is not necessary to have both sets of wires, one would be sufficient, but it is preferred to have the two. It is obvious that the horizontal bottom support 9 of the wires forms a bottom support for the berry box and the upright portions 7 will clasp the sides of the box and hold it in position.

In the modification shown in Figure 5, the shell portion 1 is of the same form as already described, and the bottom support for the box consists of a single strip having the two upright side portions 11—11 secured to the sides of the shell 1, and having a connecting transverse bottom portion 12 which is integral with the two upright portions 11—11. In this form of construction, the bottom supporting portion 12 extends directly across from the lower edge of the two end walls of the shell member 1 instead of being suspended at a distance below.

In all of the various forms of construction, there is a skeleton bottom to the holder so that after the box is filled and it is desired to remove the box from the holder, it can be removed by pushing up on the bottom of the box by the fingers through the open spaces in the bottom of the holder. This makes it unnecessary to reach down into the holder to grasp the sides of the box, and makes unnecessary the providing of any bail or handle on the box itself, as in fact the ordinary berry boxes are not provided with any bail or handle, and moreover such a bail or handle would be in the way in dropping the berries into the box and tend to bruise the berries.

The box may be readily removed from the holder without unstrapping the holder from the person of the picker, and a fresh, empty box may be inserted into the holder to be filled.

As will be seen from Figure 2, the shell extends some distance above the top of the box and has a widely flaring mouth. This affords a larger entrance to the box than the top of the box itself, so that less care is required to see that the berries go into the box instead of onto the ground, and the upwardly extending sides of the shell prevent the berries from being spilled if the box and shell are tipped somewhat at an angle.

What I claim is:—

1. A box holder for berry pickers comprising an open bottomed shell of rectangular contour having downwardly tapering side walls forming a hopper of the contour of the berry boxes to be used and of interior dimensions sufficient to admit the insertion of a berry box through the open top, narrow box supporting strip portions secured to opposite sides of the shell and which extend below the shell and project in under the open bottom to form a support for the box, and means for securing the shell to the body of the berry picker.

2. A box holder for berry pickers comprising a shell having upwardly flaring walls on all sides open at the top and the bottom, and a skeleton portion which is secured to the side walls and which extends down below the lower edge of the side walls and under the open bottom, thereby forming a support for the berry box, the walls of the shell being of sufficient height so that when the box is seated said walls extend some distance above the top of the box whereby the shell forms a temporary hopper extension top for the box which guides the berries into the box, and means for securing the holder to the body of the picker.

3. A box holder for berry pickers comprising an open bottomed shell of rectangular contour, having downwardly tapering closed side walls which form a hopper of the contour of the berry boxes to be used therewith and of interior dimensions sufficient to admit the insertion of a berry box through the open top, narrow box supporting portions which are secured to the sides of the shell and extend down below the bottom of the shell and project in under the open bottom to form a support for the box, the walls of the shell extending some distance above the top of the box when the box is seated on said bottom support and extending down below the top of the box, thereby forming a hopper to direct the berries into the box, and means for securing the shell to the body of the berry picker.

4. A box holder for berry pickers, comprising an open bottomed shell of rectangular contour, having downwardly tapering side walls forming a hopper of the contour of the berry box to be used and of interior dimensions sufficient to permit the insertion of a berry box through the open top, box supporting strip portions secured to opposite sides of the shell and which extend below the shell and project in under the open bottom to form a support for a box, the shell forming a hopper which extends above the top of the box when the latter is seated on the bottom support, and means for securing the shell to the body of the berry picker.

In testimony whereof I affix my signature.

PAUL I. ANDREWS.